(12) United States Patent  
Singh

(10) Patent No.: US 12,361,451 B2  
(45) Date of Patent: Jul. 15, 2025

(54) VISUAL ADWORDS IN AUGMENTED REALITY BASED ON QUALITY AND RARITY OF AMBIENCE SPECIFICATION

(71) Applicant: ADEIA GUIDES INC., San Jose, CA (US)

(72) Inventor: Mona Singh, Cary, NC (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/112,012

(22) Filed: Feb. 21, 2023

(65) Prior Publication Data

US 2024/0281852 A1  Aug. 22, 2024

(51) Int. Cl.
G06Q 30/00 (2023.01)
G06Q 30/0251 (2023.01)
G06V 20/20 (2022.01)

(52) U.S. Cl.
CPC ......... G06Q 30/0269 (2013.01); G06V 20/20 (2022.01)

(58) Field of Classification Search
None
See application file for complete search history.

(56) References Cited

U.S. PATENT DOCUMENTS

| | | | |
|---|---|---|---|
| 8,138,930 B1 | 3/2012 | Heath | |
| 9,299,092 B1 | 3/2016 | Brown et al. | |
| 10,911,814 B1 | 2/2021 | Mishra | |
| 2003/0023485 A1* | 1/2003 | Newsome | G06Q 30/0269 715/255 |
| 2009/0106105 A1* | 4/2009 | Lewis | G06Q 30/0273 705/14.69 |
| 2012/0143662 A1* | 6/2012 | Heath | G06Q 30/0219 705/14.5 |
| 2015/0106205 A1* | 4/2015 | Rose | G06Q 30/0269 705/14.58 |
| 2015/0278878 A1* | 10/2015 | Chau | G06Q 30/0276 705/14.58 |
| 2016/0026868 A1* | 1/2016 | Wexler | G06F 16/532 382/103 |

(Continued)

FOREIGN PATENT DOCUMENTS

| | | |
|---|---|---|
| EP | 3388929 A1 | 10/2018 |
| WO | 2019240295 A1 | 12/2019 |

*Primary Examiner* — Christopher Stroud
(74) *Attorney, Agent, or Firm* — Haley Guiliano LLP

(57) ABSTRACT

Some embodiments of the present disclosure relate to methods and systems for providing an advertisement to a user based on a collective experience of the user. One method includes accessing a plurality of ambience specifications having corresponding advertisements. Each ambience specification may comprise a first view specification and a second view specification, and each view specification may comprise a list of ambience attributes. The method may include capturing first data at a first time and determining, for each of the first view specifications, a first match quality value. The method may include capturing second data at a second time and determining, for each of the second view specifications, a second match quality value. The method may include determining a best fit ambience specification based on the first match quality values and the second match quality values, and presenting to the user, the advertisement corresponding to the best fit ambience specification.

20 Claims, 12 Drawing Sheets

(56) References Cited

U.S. PATENT DOCUMENTS

| | | |
|---|---|---|
| 2016/0132931 A1* | 5/2016 | Levinson ............ G06Q 30/0246 |
| | | 705/14.45 |
| 2016/0292744 A1 | 10/2016 | Strimaitis et al. |
| 2017/0264928 A1 | 9/2017 | Hutten |
| 2019/0114481 A1* | 4/2019 | DeChant .............. G06V 10/764 |
| 2019/0164082 A1* | 5/2019 | Wu ........................ G06N 20/00 |
| 2020/0134668 A1* | 4/2020 | Hsieh ....................... G06N 3/08 |
| 2020/0193206 A1 | 6/2020 | Turkelson et al. |
| 2020/0265613 A1* | 8/2020 | Yoon ........................ G06F 18/22 |
| 2020/0285886 A1 | 9/2020 | Jaber et al. |
| 2023/0316662 A1 | 10/2023 | Singh |

* cited by examiner

| Specification: Family at the Beach | | | | |
|---|---|---|---|---|
| Overall spec | View A followed by View B | | | |
| | | 30 < | Duration of scene in minutes | |
| | | Min | Attribute | Max |
| View A | Required | 85 < | temperature | |
| View A | Required | 75000 < | brightness | |
| View A | Required | | humidity | < 30% |
| View A | Required | 30 < | sand in percentage of viewfield | |
| View A | Required | 30 < | water in percentage of viewfield | |
| View A | Required | 10 < | children playing in viewfield | |
| View B | Required | 160 < | orientation relative to previous view | < 200 |
| View B | Required | 70000 < | brightness | |
| View B | Required | 83 < | temperature | |
| View B | Optional | 10 < | sand in percentage of viewfield | |
| View B | Required | 2 < | umbrellas in viewfield | |
| View B | Required | 3 < | adult eating or drinking in viewfield | |
| View B | Required | 2 < | children eating or drinking in viewfield | |

FIG. 3A

| Overall spec | View A followed by View B | | 60 < | Duration of scene in minutes | |
|---|---|---|---|---|---|
| | | | Min | Attribute | Max |
| View A | | Required | 80 < | temperature | |
| View A | | Required | 80000 < | brightness | |
| View A | | Required | | humidity | < 40% |
| View A | | Required | 25 < | sand in percentage of viewfield | |
| View A | | Required | 20 < | water in percentage of viewfield | |
| View A | | Optional | | buildings in viewfield | < 3 |
| View A | | Optional | 10 < | adult human sunbathing in viewfield | |
| View A | | Optional | 2 < | adult human drinking in viewfield | |
| View B | | Required | 150 < | orientation relative to previous view | < 210 |
| View B | | Required | 80 < | temperature | |
| View B | | Required | 72000 < | brightness | |
| View B | | Optional | 9 < | sand in percentage of viewfield | |
| View B | | Required | 1 < | umbrellas in viewfield | |
| View B | | Optional | 4 < | buildings in percentage of viewfield | |
| View B | | Optional | 5 < | vegetation coverage in percentage of viewfield | |
| View B | | Optional | 2 < | adult human drinking in viewfield | |

FIG. 3B

| Optionals are NA in the requirement met column | | 402 | 410A Family quality | | 460A Friends quality | |
|---|---|---|---|---|---|---|
| Observations | | View A | Quality | Requirement met? | Quality | Requirement met? |
| Temperature | | 90 | 1.06 | Yes | 1.13 | Yes |
| Brightness | | 100000 | 1.33 | Yes | 1.25 | Yes |
| Humidity | | 25 | 1.20 | Yes | 1.60 | Yes |
| Sand in viewfield | | 33% | 1.10 | Yes | 1.32 | Yes |
| Water percentage in viewfield | | 40% | 1.33 | Yes | 2.00 | Yes |
| Buildings in viewfield | | 2 | 1.00 | NA | 1.50 | NA |
| Snow percentage in viewfield | | 0% | 1.00 | NA | 1.00 | NA |
| Vegetation percentage in viewfield | | 11% | 1.00 | NA | 1.00 | NA |
| Adults playing in viewfield | | 6 | 1.00 | NA | 1.00 | NA |
| Adults sunbathing in viewfield | | 13 | 1.00 | NA | 1.30 | Yes |
| Children playing in viewfield | | 40 | 4.00 | Yes | 1.00 | NA |
| Umbrellas in viewfield | | 3 | 1.00 | NA | 1.00 | NA |
| Adults drinking in viewfield | | 4 | 1.00 | NA | 2.00 | NA |
| Adults eating in viewfield | | 3 | 1.00 | NA | 1.00 | NA |
| Adults eating or drinking in viewfield | | 5 | 1.00 | NA | 1.00 | NA |
| Children drinking in viewfield | | 6 | 1.00 | NA | 1.00 | NA |
| Children eating in viewfield | | 3 | 1.00 | NA | 1.00 | NA |
| Children eating or drinking in viewfield | | 4 | 1.00 | NA | 1.00 | NA |
| Orientation relative to previous subscene | | 120 | 1.00 | NA | 1.00 | NA |
| | | | | | | |
| Overall match quality (product of amounts) | | | 9.94 | Yes | 23.17 | Yes |

FIG. 4A

| Observations | View B | Family quality | | Friends quality | |
|---|---|---|---|---|---|
| | | Quality | Requirement met? | Quality | Requirement met? |
| Temperature | 89 | 1.07 | Yes | 1.11 | Yes |
| Brightness | 90000 | 1.29 | Yes | 1.25 | Yes |
| Humidity | 25 | 1.00 | NA | 1.00 | NA |
| Sand in viewfield | 6% | 0.60 | NA | 0.67 | NA |
| Water percentage in viewfield | 3% | 1.00 | NA | 1.00 | NA |
| Buildings in viewfield | 5 | 1.00 | NA | 1.25 | NA |
| Snow percentage in viewfield | 0% | 1.00 | NA | 1.00 | NA |
| Vegetation percentage in viewfield | 14% | 1.00 | NA | 2.80 | NA |
| Adults playing in viewfield | 6 | 1.00 | NA | 1.00 | NA |
| Adults sunbathing in viewfield | 13 | 1.00 | NA | 1.00 | NA |
| Children playing in viewfield | 2 | 1.00 | NA | 1.00 | NA |
| Umbrellas in viewfield | 2 | 1.00 | Yes | 2.00 | Yes |
| Adults drinking in viewfield | 6 | 1.00 | Yes | 3.00 | NA |
| Adults eating in viewfield | 2 | 1.00 | Yes | 1.00 | NA |
| Adults eating or drinking in viewfield | 7 | 2.33 | Yes | 1.00 | NA |
| Children drinking in viewfield | 2 | 1.00 | Yes | 1.00 | NA |
| Children eating in viewfield | 5 | 1.00 | Yes | 1.00 | NA |
| Children eating or drinking in viewfield | 5 | 2.50 | Yes | 1.00 | NA |
| Orientation relative to previous subscene | 165 | 1.25 | Yes | 1.44 | Yes |
| | | | | | |
| Overall match quality (product of amounts) | | 6.03 | Yes | 28.11 | Yes |

FIG. 4B

| | | | Quality over time | | | |
|---|---|---|---|---|---|---|
| View Number | Family view matches (wrt View A) | Family view matches (wrt View B) | Family spec matches | Friends view matches (wrt View A) | Friends view matches (wrt View B) | Friends spec matches |
| 1 | 8 | 7 | | 29 | 5 | |
| 2 | 4 | 5 | 40.00 | 26 | 25 | 725.00 |
| 3 | 2 | 3 | 12.00 | 36 | 26.8 | 696.80 |
| 4 | 6 | 5 | 10.00 | 24 | 25 | 900.00 |
| 5 | 7 | 6 | 36.00 | 15 | 27 | 648.00 |
| 6 | 4 | 7 | 49.00 | 18 | 19 | 285.00 |
| 7 | 3 | 5 | 20.00 | 11 | 10.9 | 196.00 |
| 8 | 9 | 4 | 12.00 | 47 | 24 | 264.00 |
| 9 | 11 | 3 | 27.00 | 12 | 16 | 752.00 |
| 10 | 7.8 | 7.8 | 85.80 | 13 | 26 | 312.00 |
| 11 | 3.3 | 9 | 70.20 | 18 | 19 | 247.00 |
| 12 | 8 | 8 | 26.40 | 28 | 19 | 342.00 |
| 13 | 6 | 6 | 48.00 | 22 | 24 | 672.00 |
| 14 | 2 | 5 | 30.00 | 16 | 19.7 | 433.40 |
| 15 | 7 | 11 | 22.00 | 32 | 34 | 544.00 |
| 16 | 5 | 3 | 21.00 | 22 | 19 | 608.00 |
| 17 | 4 | 6 | 30.00 | 16 | 14.9 | 327.80 |
| 18 | 9.94 | 3.00 | 12.00 | 23.17 | 23.17 | 370.66 |
| 19 | 4.00 | 6.03 | 59.95 | 11.00 | 28.11 | 651.15 |
| | | | 33.96 | | | 498.61 |

FIG. 5

| Overall | Current | Percentile wrt history |
|---|---|---|
| Family | 59.95 | 84 |
| Friend | 651.15 | 68 |

600 — Current (650)
602 — Percentile wrt history (652)

630

| Ambience specification | Min percentile | Bid amount |
|---|---|---|
| Family at the Beach | 60 | $0.10 |
| Family at the Beach | 76 | $0.18 |
| Family at the Beach | 92 | $0.34 |

680

| Ambience specification | Min percentile | Bid amount |
|---|---|---|
| Family at the Beach | 65 | $0.15 |
| Family at the Beach | 72 | $0.33 |
| Family at the Beach | 88 | $0.56 |
| Family at the Beach | 98 | $0.88 |

FIG. 6

VISUAL ADWORDS IN AUGMENTED REALITY BASED ON QUALITY AND RARITY OF AMBIENCE

TECHNICAL FIELD

Some embodiments of the present disclosure relate to enabling advertisers to target ads based on the cumulative experience of a user, in particular a user wearing or operating a virtual, augmented, or mixed reality device. Data collected over time from multiple scenes experienced by a user may be used to determine which advertisement is a best fit. Some embodiments or aspects may relate to other features or functionality.

BACKGROUND

Over time, advertisers have become more and more interested in providing targeted, relevant ads to viewers. Targeted ads provide greater return on investment, and do a better job of reaching appropriate targets for a given advertiser, without oversaturating a viewer's environment with constant advertisement. This is a leap beyond previous methods of online marketing, which included banner ads or pop-up ads that simply show to all visitors or users of a given website. On the internet, targeted marketing works by viewing the user's web surfing or shopping history and recommending more products that fall into the same genre. For example, when you select an item on the Amazon platform such as an Eveready® brand flashlight, Amazon will show ads for several other items that are related, such as other types and brands of flashlights. In some instances, the targeted ads inform the viewer that product Y is being suggested because the viewer had selected product X previously. Such platforms may also track cookies to make such product recommendations.

Although targeted marketing is somewhat effective, it still results in bombarding the user with ads that are not relevant in time. For example, a user searching for the flashlight may have already bought the flashlight by the time the targeted advertisement is delivered to them or may no longer have the need to buy a flashlight. Targeted ads also result in overadvertising to a user, which can backfire by being too intrusive to a user and producing negative impressions of the advertised product or service.

Augmented Reality (AR) devices promise to provide highly effective ads by placing ads in an active context for the user. However, many AR practices simply copy the same practices used online, such as similar targeted ads placement. In some cases, advertisements can be targeted to a user based on simple types of triggers like the detection of a particular object in the user's view field or the AR device being located in a particular location.

SUMMARY

As noted above, some AR advertising methods have drawbacks that reduce their effectiveness. For example, some AR advertising methods are limited to providing advertisements based on simple triggers like the detection of a particular object in the viewfield, or detecting that the AR device is operating in a particular location.

One or more embodiments of the present disclosure may be implemented to address this problem. For example, an example disclosed technique includes enabling advertisers to target their advertisements using more complex triggers, which encompass multiple different ambience attributes being detected over time. This enables the advertiser to present an advertisement only when a particular set of conditions are met over time, and not simply present an advertisement based on a single snapshot in time when an object is detected, or the device is detected in a particular location. Unlike many traditional AR systems, the disclosed techniques enable ad targeting within an AR context based on the cumulative experience of a user over time, thereby increasing the chance that the ad will capture the viewer's attention.

In one example implementation, an advertiser may specify an ambience specification comprising two or more view specifications that are offset from each other in time. This may enable greater complexity and nuance in determining whether to provide a particular advertisement to a particular user. Each view specification includes a plurality of ambience attributes, which correspond to data that is collected from one or more sensors, from the viewfield of the AR device being used, or from other sources. As data is collected over time, successive snapshots of the data (i.e., data corresponding to a given moment in time) are compared to the view specifications for one or more ambience specifications, to determine corresponding match quality values. The system then determines a best fit ambience specification, by determining the ambience specification having the highest combined match quality values for all included view specifications.

For instance, at time T=0 the data collected by the AR device may have good match with both first view specifications of a first and a second ambience specification. At time T1, the data collected by the AR device may have good match with the second view specification of the first ambience specification, but a bad match with the second view specification of the second ambience specification. In this scenario, the system may select the first ambience specification as a best fit because both the first and the second view specifications of the first ambience specification had a good match, while the second view specification of the second ambience specification had a bad match. The details of these analysis and determinations are described in further detail below.

Another problem with some AR systems is that many AR marketing techniques can be imprecise in targeting the right users, which can lead to reduced conversion rates. Advertisers spend considerable effort and expense developing a brand image but are limited in their methods for targeting advertisements at users who might be receptive.

This problem may be addressed by enabling advertisers to use their brand image as a trigger for presenting advertisements, rather than the relatively crude trigger of a particular object identification or presence in a location. The present disclosure enables advertisers to identify users who are having a specific experience which aligns with their brand image, and are thus much more likely to be responsive to an advertisement for that brand. For example, the brand image of a product such as an electric vehicle may be based on fun and family. The advertiser may target an advertisement for that vehicle to a user who is experiencing fun in the company of his or her family. Another user who is also having fun, but who does not have a family, may not be as receptive to the family-based advertisement. Embodiments of the present disclosure help to identify users who would be most responsive to the advertiser's brand image. Well-matched advertisements can lead to higher conversion rates and user satisfaction.

Another problem with some existing methods is that the effectiveness of a given advertisement may be reduced the more it is presented to a user, or if it is similar to many advertisements the user has recently been exposed to.

In an example implementation, one or more disclosed techniques address this issue. For example, one or more disclosed techniques include determining a rarity value with respect to each ambience specification and user at any given time. As a user goes about their life, they may experience certain situations fairly often (e.g., completing a morning routine, commuting to and from work, etc.). The data collected during these situations may match well with certain ambience specifications, and thus certain advertisements may be routinely presented to the user. However, the conversion rate for these advertisements may be low if they are presented too often to the user. If, however, a new ambience specification has a decently good match quality, the advertiser may wish to present the new ad to the user even if it does not have the best match quality, simply because the novelty or rarity of the new advertisement can lead to a higher conversion rate. Thus, when two ambience specifications both sufficiently match with the current experience of a user, the advertiser may wish to select the rarer ambience specification as the best fit even if it is technically a worse match based purely on the relevant ambience attributes.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 3A is a chart illustrating first and second view specifications for a first ambience specification, in accordance with some embodiments of the disclosure;

FIG. 3B is a chart illustrating first and second view specifications for a second ambience specification, in accordance with some embodiments of the disclosure;

FIG. 4A is a chart illustrating the calculation of respective first match quality values for the first view specifications of FIGS. 3A and 3B;

FIG. 4B is a chart illustrating the calculation of respective second match quality values for the second view specifications of FIGS. 3A and 3B;

FIG. 5 is a chart illustrating a series of first and second match quality values from FIGS. 4A and 4B over time;

FIG. 6 illustrates a first chart showing example match quality values and corresponding rarity values of the first and second ambience specifications, and a second chart showing an example bid specification used to determine a best fit ambience specification, in accordance with some embodiments of the disclosure;

DETAILED DESCRIPTION

Some or all of the limitations discussed above are addressed in this disclosure by providing systems and methods for enabling advertisers to target advertisements at users based on a collective experience of each user over time. The systems and methods disclosed herein enable users to bid on and purchase specific "visual adwords" based on the quality of a match between the user's experience and an "ambience specification," and based on the rarity of the user's experience.

At a high level, a basic advertising framework includes advertisers developing specific advertisements that they wish to present to a certain subset of people who are likely to engage with the advertisement. Rather than simply presenting the advertisement to all people viewing a particular location (e.g., a billboard), or all people viewing a particular television show, an example advertiser may develop an advertisement they wish to target to a particular subset of consumers having a particular experience. The advertiser may thus wish to use this particular "user experience" as a trigger to present the advertisement, to avoid over saturating the environment or the user's attention with their advertisement.

To quantify the user experience, the advertiser may develop an "ambience specification" which attempts to break the targeted user experience down into two or more scenes or views which the user experiences over time, and for which data (i.e., ambience attributes) can be collected and analyzed. This framework enables the advertiser to target the overall experience of a user as identified through data collected at different points in time, rather than a single location, object, or circumstance.

Figure 2:
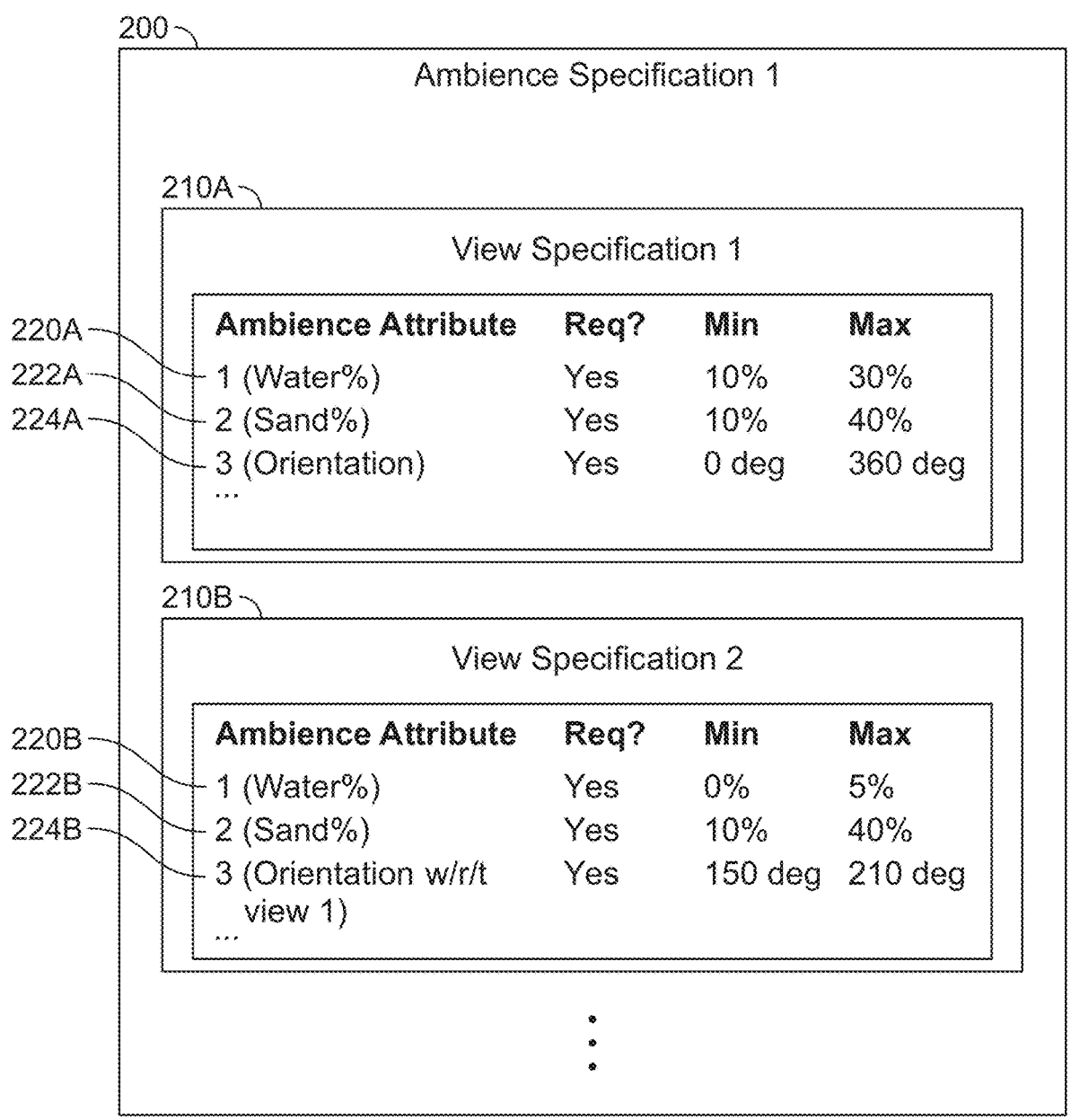
FIG. 2 is a simplified block diagram illustrating the relationship between an ambience specification, view specifications, and ambience attributes, in accordance with some embodiments of the disclosure.

FIG. 2 illustrates a simplified structure of an example ambience specification 200, according to an embodiment. In some examples, the advertiser may develop the ambience specification such that it targets certain features or measurable attributes that their target audience will experience. The ambience specification 200 includes a first view specification 210A and second view specification 210B. The first view specification 210A pertains to a first scene or first view that the advertiser expects the user to experience at a first point in time. The second view specification 210B pertains to a second scene or second view that the advertiser expects the user to experience at a second, later point in time. Taken together, the first and second view specifications 210A and 210B enable the advertiser to selectively target users who experience the first view and then later experience the second view. Advertisers thus have much more granularity in selecting which users to advertise to and at what time to present the advertisement. For instance, the advertisement is presented only after both the first and second views have been experienced in order.

Each view specification 210A and 210B includes a plurality of ambience attributes 220A-224A and 220B-224B respectively. Each of the ambience attributes refers to a quantifiable value or range of values that can be used by an advertiser to attempt to target users having a specific relevant experience. For instance, an ambience attribute may be (a) a range of allowable sensor values (e.g., temperature between 75 and 90 degrees Fahrenheit), or (b) a visual pattern identifiable from an image captured by a camera of the user device (e.g., greater than 30% water in the viewfield). The ambience attributes may refer to any data identified in a viewfield of a user's AR device (i.e., visual patterns), data collected by one or more sensors of the device, and/or data collected by one or more remote devices or systems. Generally speaking, references herein to an "AR device" refer to devices providing extended reality (XR), mixed reality (MR), or AR functionality (e.g., wherein virtual objects or graphic overlays are provided in addition to real-world objects or environments visible via the device). For example, the ambience attributes may include (i) a temperature, (ii) a brightness, (iii) a sound, (iv) speech data, (v) the user's emotional state, (vi) the identity of one or more objects (or people) present in the viewfield, (vii) the number of a given object (or people) present in the viewfield, (viii) the percentage of a particular environment in the viewfield, (ix) the device orientation or change in orientation with respect to a previous view, (x) the device location, (xi), the time of day, week, month, or year, (xii), the humidity level, (xiii) the passage of a threshold amount of time since a last view, and more.

Some ambience attributes may be required, while others may be optional. If required ambience attributes are not met by the observed or collected data, the view specification may not be satisfied and a corresponding advertisement may not be displayed. Optional ambience attributes may be used to determine a match quality value of the view specification, but may be deemed not applicable for purposes of determining whether all of the view specification requirements are met. For example, where an optional ambience attribute is the presence of 2 or more buildings in view, even if no buildings are observed the view specification may still be deemed satisfied for purposes of determining a best fit ambience specification. The match quality value may simply be reduced.

In some examples, one or more ambience attributes listed in the view specification may include a range of acceptable values (e.g., between 10-30% water in viewfield; greater than 5 adults in view; less than 90 degrees, etc.). Additionally, a view specification may include a specified duration (i.e., less than 30 minutes) since a last view.

In some examples, an ambience specification may include two view specifications that are offset from each other in time. For instance, the ambience specification 200 may specify that the first view 210A must be satisfied before the second view specification 210B. Alternatively, an ambience specification may include three or more view specifications. In some examples, the three or more view specifications may be required to be satisfied in a particular order (e.g., A-B-C), or in any order (e.g., A-C-B; B-C-A; etc.). Furthermore, where the ambience specification includes multiple view specifications, the ambience specification may require a repeat vie specification (e.g., A-B-A-C). Other variations are possible as well.

Referring now to FIGS. 1A-B, 3A-B, 4A-B, 5, and 6, the process for determining which ambience specification is a best fit, and thus which advertisement to present to a user, is described.

As noted above, an advertiser specifies an ambience specification for each advertisement they wish to present. The ambience specification comprises a series of view specifications that each quantify a scene or view the advertiser wishes for a target user to experience. If a user experiences the two scenes in the order specified in the ambience specification, and several other conditions are met (e.g., match quality and rarity) then the advertiser may wish to present a relevant advertisement to the user.

For example, an advertiser may have two advertisements each with a corresponding ambience specification. FIG. 3A illustrates a first example ambience specification 300 called "family at the beach," and FIG. 3B illustrates the second example ambience specification 350 called "friends at the beach." These titles are for illustration purposes only, and should not be read as limiting the scope of the disclosure. The "family at the beach" ambience specification 300 may have a corresponding advertisement that is family oriented, and is likely to be relevant to a family at the beach. Similarly, the "friends at the beach" ambience specification 350 may have a corresponding advertisement that is friend oriented, and it likely to be relevant to friends at the beach.

Referring specifically to FIG. 3A, the "family at the beach" ambience specification 300 includes two view specifications, split into the A view (310A) and the B view (310B). The view specification 310A for view A includes a list of ambience attributes directed to quantifying that the user has a view looking at the water from the beach, along with certain other objects in view (e.g., children playing). View specification 310B for view B includes a list of ambience attributes directed to quantifying that the user has a view looking away from the water (i.e., between 160 and 200 degrees oriented relative to view A), along with certain other objects in view (e.g., umbrellas, adults eating or drinking, and children eating or drinking). Additional ambience attributes (e.g., temperature, brightness, etc.) may also be required or optional in one or more of the view specifications. Ostensibly, the progression of views from view A to view B (i.e., looking toward the water to looking away from the water at a later time) in combination with the rest of the ambience attributes may indicate that the user is relaxing at the beach in view A, and then gets up to leave the beach in view B. When the user is leaving the beach he or she may be receptive to a certain type of advertisement (e.g., an advertisement for a family restaurant).

Referring now to FIG. 3B, the "friends at the beach" ambience specification 350 also includes two view specifications, split into the A view (360A) and the B view (360B). The view specification 360A for view A includes a list of ambience attributes directed to quantifying that the user has a view looking at the water from the beach with certain other objects in view. View specification 360B includes a list of ambience attributes directed to quantifying that the user has a view looking away from the water (i.e., between 150 and 210 degrees oriented relative to view A), along with certain other objects in view (e.g., umbrellas). Additional ambience attributes (e.g., temperature, brightness, humidity, adults drinking in the viewfield, etc.) may also be required or optional in one or more of the views. Ostensibly, the progression of views from view A to view B (i.e., looking toward the water to looking away from the water) in combination with the rest of the ambience attributes may indicate that the user is getting up to leave the beach, and may be receptive to a certain advertisement (e.g., an advertisement for a bar or other establishment for friends who enjoy drinking at the beach).

Once an ambience specification and the corresponding view specifications are determined, they may be stored for later use. The system may then gather data from users to determine whether one or more of the ambience specifications is a best fit (i.e., a match quality above some threshold value), and thereby determine whether and which advertisement to present to a user.

Figure 1A:
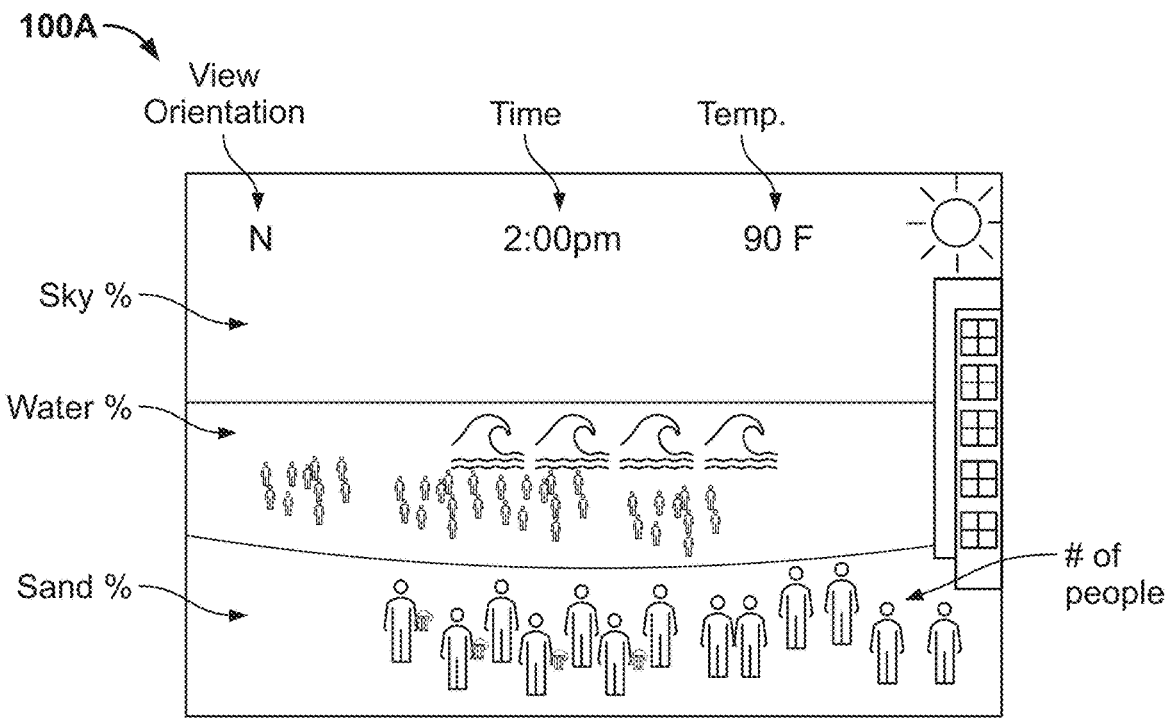
FIGS. 1A and 1B illustrate example first and second scenes showing ambience attributes used to determine a best fit ambience specification, in accordance with some embodiments of the disclosure.
Figure 1B:
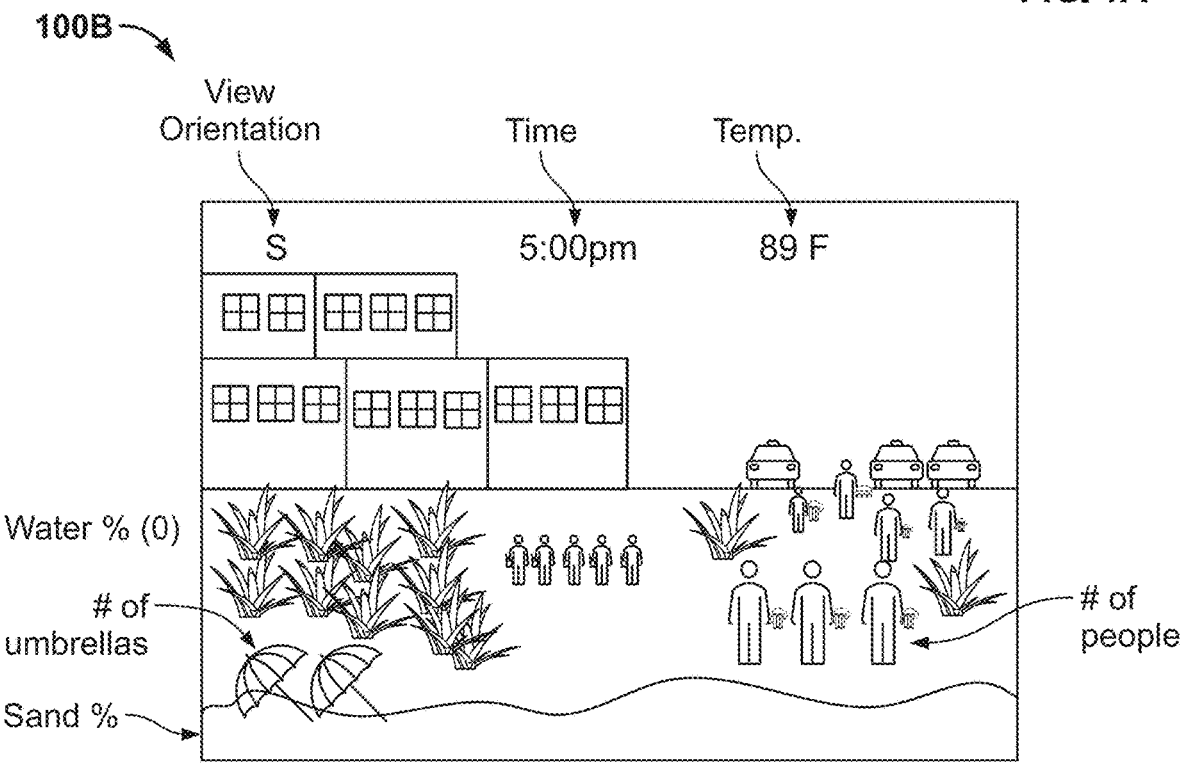

FIGS. 1A and 1B illustrate example partial viewfields 100A and 100B for an example user at two different points in time, according to an embodiment. FIG. 1A illustrates a partial viewfield 100A of the example user at 2:00 pm. The partial user viewfield 100A shows various observations detected by image analysis, as well as information collected from one or more other sensors (e.g., temperature, orientation, etc.). This collected data corresponds to the ambience attributes listed in the first view specifications 310A and 360A in each of FIGS. 3A and 3B.

As can be seen in FIG. 1A, the captured first data (or first observations) includes: (a) orientation looking north, (b) time is 2:00 pm, (c) temperature is 90 degrees Fahrenheit, (d) the brightness is 100,000, (e) humidity level of 25, (f) sand is 33% of the viewfield, (g) water is 40% of the viewfield, (h) 40 children are playing within view, (i) 2 buildings are in view, (j) 13 adults sunbathing in view, and (k) 4 adults drinking in view.

The system may gather these observations via analysis of images captured by the user's AR device, as well as one or more other sensors of the user device. In some examples, the data may be collected from one or more other sources, such as a connected phone or tablet, to collect weather data, humidity, temperature, and more.

The system may then determine a first match quality value for each of the first view specifications 310A and 360A based on the collected first data (e.g., the observations from FIG. 1A). Determining the first match quality value includes, for each ambience attribute of the respective first view specification, determining an ambience attribute value based on the captured first data and a pre-defined range corresponding to the ambience attribute, and calculating a product of the ambience attribute values for all ambience attributes of the respective first view specification. Put another way, the system may determine for the view shown in FIG. 1A, for each of the first view specifications (310A and 360A corresponding to the possible matching ambience specifications 300 and 350), a respective first match quality value. The match quality value is determined based on a comparison of the captured first data to the list of ambience attributes of the respective first view specification 310A or 360A.

An ambience attribute value for every ambience attribute in each view specification is determined using the following guidelines. One of ordinary skill in the art should appreciate that other ways of calculating the match quality values are possible as well. The following guidelines provide one possible method for the purpose of illustration.

Where a view specification specifies a lower bound (L) for a given ambience attribute, and/or an upper bound (U) for the ambience attribute, the method for calculating the ambience attribute value for that ambience attribute, based on the observed value (Ob), is as follows:

View specification lists the acceptable range as: L<Ob, then the ambience attribute value AAV=Ob/L View specification lists the acceptable range as: Ob<U, then the ambience attribute value AAV=U/Ob View specification lists the acceptable range as: L<Ob<U, then the ambience attribute value AAV=(Ob/L)×(U/Ob)

If an ambience attribute is required by the view specification, and the observed value falls within the range requirement listed in the view specification, the ambience attribute value may be determined using the formulas noted above.

If an ambience attribute is optional in the view specification, and the observed value falls within the range requirement listed in the view specification, the ambience attribute value may be determined using the formulas noted above, and a marker may be set to "not applicable" (NA) to indicate that the requirement is not applicable.

If an ambience attribute is required by the view specification, and the observed value does not fall within the range requirement listed in the view specification, the ambience attribute value may be set to zero (0), or may be determined using the formulas noted above, and a marker may be set indicating that the ambience attribute requirement is not met.

If an ambience attribute is optional in the view specification, and the observed value does not fall within the range requirement, the ambience attribute value may be determined using the formulas above, and a marker may be set to NA to indicate that the requirement is not applicable.

Where all required ambience attributes are met (i.e., the observed values fall within the pre-defined ranges), then the view specification may be satisfied. However, if one or more required ambience attributes are not met (e.g., one or more of the ambience attributes are marked as not met), then the view specification may not be satisfied. Where one or more optional ambience attributes are not met, and marked as NA, the system may still determine that the view specification is satisfied, so long as all the required ambience attributes are met.

The system performs the ambience attribute value calculations noted above for each ambience attribute in each applicable view specification. If any ambience attribute is required, but is not met by the observed value, then the overall match quality value for the view specification may be zero (0) since all requirements are not met. However, if all required ambience attributes are met (i.e., the observed values for all required ambience attributes fall within the specified range), then the system may determine an overall match quality value of the view specification by multiplying all of the ambience attribute values for the individual ambience attributes.

FIG. 4A illustrates an example set of observed values 402 from the scene illustrated in FIG. 1A, according to an embodiment. FIG. 4A also illustrates the resulting ambience attribute values (410A and 460A) of those observed values based on the first view specifications 310A and 360A of the family at the beach ambience specification 300 and the friends at the beach ambience specification 350 respectively. In other words, FIG. 4A illustrates how the observed values of FIG. 1A compare to the ambience attributes listed in the view specifications 310A and 360A.

As can be seen in FIG. 4A, all of the required ambience attributes are met by the observed data. The ambience attribute values for the ambience attributes are multiplied together to determine the overall match quality value of the view specification. The first match quality value of the first view specification 310A based on the observed first data and the ambience attributes of the first view specification 310A is 9.94. The first match quality value of the first view specification 360A based on the observed first data and the ambience attributes of the first view specification 360A is 23.17. In other words, FIG. 4A shows that the match between the view shown in FIG. 1A and the first view specification 310A of the family at the beach ambience specification is 9.94, and the match between the view shown in FIG. 1A and the first view specification 360A of the friends at the beach ambience specification is 23.17. These values may be stored for later use.

Continuing with the Example shown in the figures, FIG. 1B illustrates a partial viewfield 100B of the example user at 5:00 pm. The partial user viewfield 100B shows various observations detected by image analysis, as well as information collected from one or more other sensors (e.g., temperature, orientation, etc.). This collected data corresponds to the ambience attributes listed in the second view specifications 310B and 360B in each of FIGS. 3A and 3B.

As can be seen in FIG. 1B, the captured second data (or second observations) includes: (a) orientation looking south (i.e., a 165 degree change from view A), (b) time is 5:00 pm, (c) temperature is 89 degrees Fahrenheit, (d) the brightness is 90,000, (e) sand is 6% of the viewfield, (f), 2 umbrellas in view, (g) 7 adults eating or drinking, (h) 6 adults drinking, (i) 5 children eating or drinking, (j) 5 buildings in view, (k) 14% vegetation coverage.

The system may gather this second data using the user's AR device at a second time using one or more sensors of the device (e.g., camera, inertial/orientation sensor, etc.). The AR device and/or a connected device may also perform image analysis to detect the number of objects, identity of objects, and other observations noted above. The system may also gather data from other sources, such as a connected phone or tablet, to get weather data, humidity, temperature, etc.

In some examples, the second view specification may include one or more ambience attributes that are relative to an attribute from the corresponding first view specification. For example, note that one of the ambience attributes in the second view specification 310B is a change in the orientation of the AR device with respect to the first view.

After gathering the second data, the system may determine a second match quality value for each of the second view specifications. This includes, for each ambience attribute of the respective second view specification, determining an ambience attribute value based on the captured second data and a pre-defined range corresponding to the ambience attribute, and calculating a product of the ambience attribute values for all ambience attributes of the respective second view specification. Put another way, the system may determine for the view shown in FIG. 1B, for each of the second view specifications (310B and 360B corresponding to the possible matching ambience specifications 300 and 350), a respective second match quality value. The second match quality value is determined based on a comparison of the captured second data to the list of ambience attributes of the respective second view specification 310B or 360B. This process of determining the match quality values for each of the ambience attributes, and then determining the overall match quality value of each view specification 310B and 360B may be similar or identical to that described above with respect to FIGS. 1A and 4A.

FIG. 4B illustrates an example set of observed values 452 from the scene illustrated in FIG. 1B, according to an embodiment. FIG. 4B also illustrates the resulting ambience attribute values (410B and 460B) of those observed values based on the second view specifications 310B and 360B of the family at the beach ambience specification 300 and the friends at the beach ambience specification 350 respectively. In other words, FIG. 4B illustrates how the observed values of FIG. 1B compare to the ambience attributes listed in the view specifications 310B and 360B.

As can be seen in FIG. 4B, all of the required ambience attributes are met by the observed data. The ambience attribute values for the ambience attributes are multiplied together to determine the overall match quality value of the view specification. The second match quality value of the second view specification 310B based on the observed second data and the ambience attributes of the second view specification 310B is 6.03. The second match quality value of the second view specification 360B based on the observed second data and the ambience attributes of the second view specification 360B is 28.11. In other words, FIG. 4B shows that the match between the view shown in FIG. 1B and the second view specification 310B of the family at the beach ambience specification is 6.03, and the match between the view shown in FIG. 1B and the second view specification 360B of the friends at the beach ambience specification is 28.11. These values may be stored for later use.

In some examples, the comparison between observed data and various ambience attributes may be done with respect to all possible view specifications (i.e., not just the first or second view specification for a given ambience specification). This may enable a rolling collection of data, and a comparison between gathered data and various view specifications on a rolling basis. In some examples, the system may be configured to continuously capture or gather data at a regular or irregular interval. The system may then determine, at the regular interval for each of the first and second view specifications of the plurality of ambience specifications, respective additional match quality values based on a comparison of the captured additional data to the ambience attributes of the respective view specification.

FIG. 5 is a chart illustrating the concept of an example rolling collection of data and comparison to multiple example view specifications, according to an embodiment. FIG. 5 is a chart 500 illustrating the match quality values in rows 510A and 510B for the first view specification 310A and second view specification 310B of the first ambience specification 300. Chart 500 also illustrates the match quality values in rows 560A and 560B for the first view specification 360A and second view specification 360B of the second ambience specification 350.

In FIG. 5, the view number column refers to a snapshot in time or a particular time period and the data collected for that time period. Column 510A indicates the overall match quality value of the observed data from each snapshot with the first view specification 310A of the first ambience specification 300. Column 510B indicates the overall match quality value of the observed data from each snapshot with the second view specification 310B of the first ambience specification 300. Column 560A indicates the overall match quality value of the observed data from each snapshot with the first view specification 360A of the second ambience specification 350. And column 560B indicates the overall match quality value of the observed data from each snapshot with the second view specification 360B of the second ambience specification 350.

The overall match quality value of each ambience specification (i.e., column 520 for the first ambience specification 300 and column 570 for the second ambience specification) is determined by multiplying the match quality value for the respective first view specification at a first time (i.e., first view number) with the match quality value for the corresponding second view specification at a second time (i.e., the next view number down). For example, the overall match quality value for the first ambience specification 300 (column 520) at the $19^{th}$ view time is 59.95=9.94×6.03 (the match quality value for the first view specification in row 18× the match quality value for the second view specification in row 19).

In some examples, the time between successive views may be 5 minutes, 30 minutes, or some other interval. Additionally, the match quality values (e.g., columns 510A, 510B, 520, 560A, 560B, and 570) may be stored for later use, and the underlying data used to make those determinations may be purged or deleted. It may be beneficial to limit storage of data (especially where the data is voluminous) as well as to avoid storing match quality values that are older than some threshold, so as to avoid using old data to determine the best fit ambience specification (discussed in further detail below).

After determining the match quality values for the first and second view specifications, and thus the overall match quality values for the respective ambience specifications, the system may be configured to determine a best fit ambience specification of the plurality of ambience specifications based on the first match quality values and the second match quality values. The "best fit" ambience specification may refer to the ambience specification with the highest overall match quality value relative to other ambience specifications or the highest match quality relative to historic match quality values of that particular ambience specification (i.e., the ambience specification having a high rarity value). Additionally, the system make take into account other information (such as bid values) in determining the best fit ambience specification. The rarity value for a given ambience specification comprises a comparison of the current ambience specification value to historic ambience specification values.

FIG. 6 illustrates a first chart showing example match quality values 600 and 650 corresponding to the first ambience specification 300 shown in FIG. 3A and the second ambience specification 350 shown in FIG. 3B respectively, according to an embodiment. The first chart also shows the corresponding rarity values 602 and 652. These rarity values are determined by comparing the current match quality value to previous values. In the illustrated example, the rarity value or percentile for the first ambience specification is 84%, because exactly 16 of the 19 matches (i.e., the stored history shown in FIG. 5) are less than the current value of 59.95. Similarly, the rarity value or percentile for the second ambience specification is 68% because exactly 13 of the 19 matches are greater than it.

The rarity of an ambience specification with respect to a given user's experience provides the benefit of indicating when the user is in a rare circumstance. Users in this rare circumstance may be more open to or more responsive to particular advertisements that are also directed to that experience. Using the rarity value also avoids presenting the same ad repeatedly, and brings novel ads to the user's attention. In this case, since the first ambience specification achieves the $84^{th}$ percentile whereas the second ambience specification achieves the $68^{th}$ percentile, the user's experience indicates that the first ambience specification is rarer than the second ambience specification. Thus, all else being equal, the system may decide that the first ambience specification is the best fit, and provide the corresponding advertisement to the user.

However, in some circumstances, the system may use a bid specification along with the rarity values to determine the best fit ambience specification. FIG. 6 illustrates an example bid specification 630 for the first ambience specification 300 and an example bid specification 680 for the second ambience specification 350. The first advertiser submitted the first ambience specification along with a bid specification 630 listing several percentile thresholds for different amounts they would be willing to pay to reach a user. Similarly, the first advertiser (or a second advertiser) submitted the second ambience specification along with a bid specification 680 listing several percentile thresholds for different amounts they would be willing to pay to reach a user. If an advertiser wants to target an advertisement to extremely rare views, then they can set a bid of $5 for $99.99^{th}$ percentile and a bid of zero for lower percentiles, for example.

In the illustrated example, the system determines the percentiles for all matching ambience specifications and determines their corresponding bid amounts. The system then selects an advertisement for the ambience specification having a higher bid amount. As shown in FIG. 6, the system may compute the revenue at view #19 based on the above data and bids. The first ambience specification achieves the $84^{th}$ percentile. Therefore, showing the corresponding ad would produce a revenue of $0.18. The second ambience specification achieves the $68^{th}$ percentile. Therefore, showing the corresponding ad would produce a revenue of $0.15. The system will select the ambience specification with the higher revenue (i.e., the first ambience specification).

In other words, to determine the best fit ambience specification taking into account both rarity and the bid values, the system may be configured to, for each of the plurality of ambience specifications, determining a set of possible rarity value ranges, each possible rarity value range having a corresponding bid value; and determining the best fit ambience specification based on the bid values for the plurality of ambience specifications.

After determining the best fit ambience specification, the system may present an advertisement corresponding to the selected best fit ambience specification (based on rarity and/or the bid specification) to the user. This may include transmitting the advertisement for display on the user's AR device, a connected device (e.g., phone, tablet), through speakers, or via some other medium.

Figure 7:
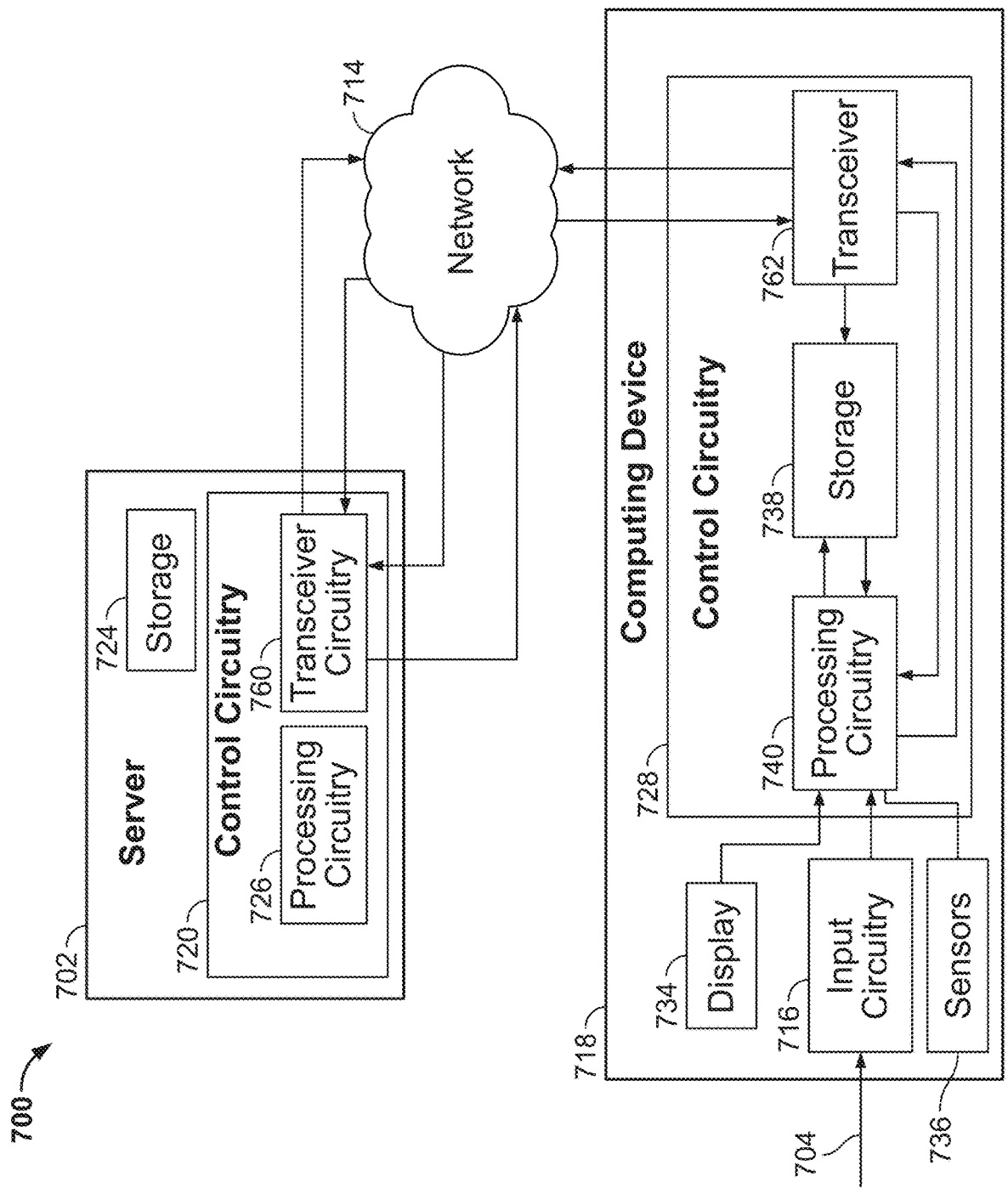
FIG. 7 is a block diagram of an exemplary system for providing advertisements, in accordance with some embodiments of the disclosure.
Figure 8:
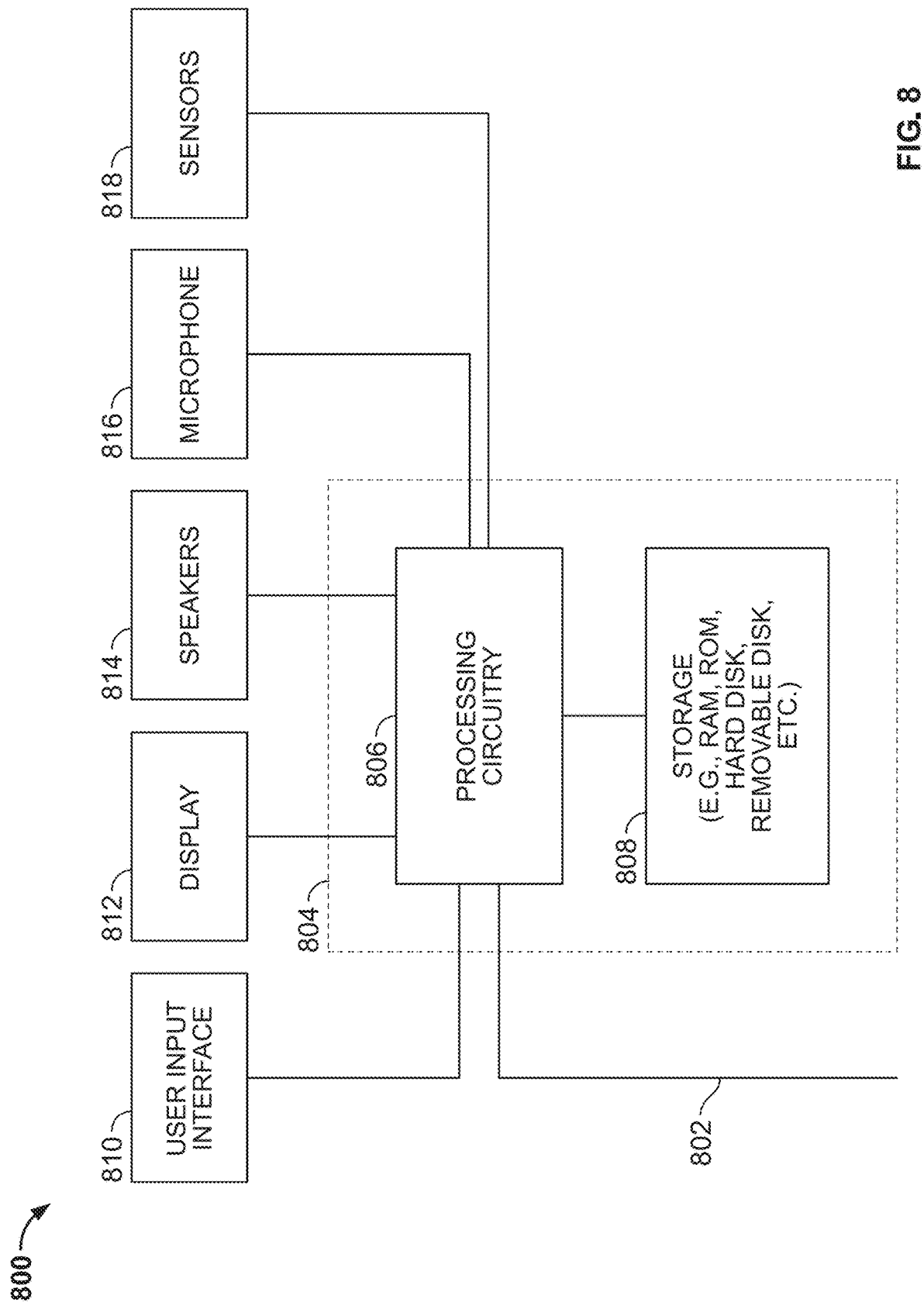
FIG. 8 is a block diagram of a generalized computing device, in accordance with some embodiments of the disclosure.

FIG. 7 is a block diagram of an exemplary system for determining a best fit ambience specification, in accordance with some embodiments of the disclosure; and FIG. 8 is a block diagram of an example generalized user device (e.g., AR device), in accordance with some embodiments of the disclosure. FIGS. 7 and 8 also describe exemplary devices, systems, servers, and related hardware that may be used to implement processes, functions, and functionalities described in relation to FIGS. 1-6. Further, FIGS. 7 and 8 may also be used for allowing communications between two separate user devices, such as the user device and one or more servers or remote computing devices. They may also be used to display content such as advertisements, capture live real-time content (e.g., first and/or second data), and/or communicate with other devices to receive various data. They may be used capture real-life objects within a field of view of a virtual, augmented, or mixed reality camera and display virtual, augmented, or mixed reality content in a virtual setting. They may also be capable of processing camera, LIDAR, and GPS and IoT device inputs. Additionally, they may be used to implement all the functionality and processes described by the embodiments disclosed in this application.

In some embodiments, one or more parts of, or the entirety of system 700, may be configured as a system implementing various features, processes, functionalities, tables, schedules, user interfaces, and components of FIGS. 1-6 and 9-10. Although FIG. 7 shows a certain number of components, in various examples, system 700 may include fewer than the illustrated number of components, multiples of one or more of the illustrated number of components, and/or one or more additional components.

System 700 is shown to include a computing device 718, a server 702 and a communication network 714. It is understood that while a single instance of a component may be shown and described relative to FIG. 7, additional instances of the component may be employed. For example, server 702 may include, or may be incorporated in, more than one server. Similarly, communication network 714 may include, or may be incorporated in, more than one communication network. Server 702 is shown communicatively coupled to computing device 718 through communication network 714. While not shown in FIG. 7, server 702 may be directly communicatively coupled to computing device 718, for example, in a system absent or bypassing communication network 714.

Communication network 714 may comprise one or more network systems, such as, without limitation, an internet, LAN, WIFI or other network systems suitable for audio processing applications. In some embodiments, system 700 excludes server 702, and functionality that would otherwise be implemented by server 702 is instead implemented by other components of system 700, such as one or more components of communication network 714. In still other embodiments, server 702 works in conjunction with one or more components of communication network 714 to implement certain functionality described herein in a distributed or cooperative manner. Similarly, in some embodiments, system 700 excludes computing device 718, and functionality that would otherwise be implemented by computing device 718 is instead implemented by other components of system 700, such as one or more components of communication network 714 or server 702 or a combination. In still other embodiments, computing device 718 works in conjunction with one or more components of communication network 714 or server 702 to implement certain functionality described herein in a distributed or cooperative manner.

Computing device 718 includes control circuitry 728, display 734, input circuitry 716, and one or more sensors 736. Control circuitry 728 in turn includes transceiver circuitry 762, storage 738 and processing circuitry 740. In some embodiments, computing device 718 or control circuitry 728 may be configured as computing device 800 of FIG. 8.

Server 702 includes control circuitry 720 and storage 724. Each of storages 724 and 738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 724, 738 may be used to store various types of content, metadata, and or other types of data (e.g., they can be used to store a user's history, match quality values, and more). Non-volatile memory may also be used (e.g., to launch a boot-up routine and other instructions). Cloud-based storage may be used to supplement storages 724, 738 or instead of storages 724, 738. In some embodiments, the ambience specifications, view specifications, ambience attributes, observations (e.g., first and second data), ambience attribute values, match quality values, rarity values, bid specifications, and advertisements may be stored in one or more of storages 724, 738.

In some embodiments, control circuitry 720 and/or 728 executes instructions for an application stored in memory (e.g., storage 724 and/or storage 738). Specifically, control circuitry 720 and/or 728 may be instructed by the application to perform the functions discussed herein. In some implementations, any action performed by control circuitry 720 and/or 728 may be based on instructions received from the application. For example, the application may be implemented as software or a set of executable instructions that may be stored in storage 724 and/or 738 and executed by control circuitry 720 and/or 728. In some embodiments, the application may be a client/server application where only a client application resides on computing device 718, and a server application resides on server 702.

The application may be implemented using any suitable architecture. For example, it may be a stand-alone application wholly implemented on computing device 718. In such an approach, instructions for the application are stored locally (e.g., in storage 738), and data for use by the application is downloaded on a periodic basis (e.g., from an out-of-band feed, from an internet resource, or using another suitable approach). Control circuitry 728 may retrieve instructions for the application from storage 738 and process the instructions to perform the functionality described herein. Based on the processed instructions, control circuitry 728 may determine a type of action to perform in response to input received from input circuitry 716 or from communication network 714. For example, in response to collecting data via the one or more sensors 736, the control circuitry 728 may perform the steps of determining ambience attribute values described above with respect to FIGS. 1A, 1B, 4A, and 4B.

In client/server-based embodiments, control circuitry 728 may include communication circuitry suitable for communicating with an application server (e.g., server 702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 714). In another example of a client/server based application, control circuitry 728 runs a web browser that interprets web pages provided by a remote server (e.g., server 702). For example, the remote server may store the instructions for the application in a storage device. The remote server may process the stored instructions using circuitry (e.g., control circuitry 728) and/or generate displays. Computing device 718 may receive the displays generated by the remote server and may display the content of the displays locally via display 734. This way, the processing of the instructions is performed remotely (e.g., by server 702) while the resulting displays, such as the display windows described elsewhere herein, are provided locally on computing device 718. Computing device 718 may receive inputs from the user via input circuitry 716 and transmit those inputs to the remote server for processing. Alternatively, computing device 718 may receive inputs from the user via input circuitry 716 and process the received inputs locally, by control circuitry 728.

Server 702 and computing device 718 may transmit and receive content and data such as observations or collected data from the various sensors 736, as well as one or more connected devices. Control circuitry 720, 728 may send and receive commands, requests, and other suitable data through communication network 714 using transceiver circuitry 760, 762, respectively. Control circuitry 720, 728 may communicate directly with each other using transceiver circuits 760, 762, respectively, avoiding communication network 714.

It is understood that computing device 718 is not limited to the embodiments and methods shown and described herein. In nonlimiting examples, computing device 718 may be an XR, MR, or AR headset (e.g., having a form factor such that it appears to be a pair of glasses), a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of operating as described in this disclosure.

Control circuitry 720 and/or 728 may be based on any suitable processing circuitry such as processing circuitry 726 and/or 740, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 720 and/or control circuitry 728 are configured to implement the various features and embodiments described and shown in this disclosure and with reference to FIGS. 1-6 and 9-10.

Computing device 718 receives a user input 704 at input circuitry 716.

Computing device 718 may also receive input from one or more other devices (not shown) via the input circuitry 716.

Computing device 718 also receives input from the one or more sensors 736. For example, the sensors 736 may include a camera, microphone, inertial sensors, and more. Transmission of user input 704, data input via sensors 736, and/or data input via one or more other devices (not shown) to computing device 718 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 716 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 740 may receive input 704 from input circuit 716, and/or data from sensors 736. Processing circuitry 740 may convert or translate the received user input 704 that may be in the form of voice input into a microphone, or movement or gestures to digital signals. In some embodiments, input circuit 716 performs the translation to digital signals. In some embodiments, processing circuitry 740 (or processing circuitry 726, as the case may be) carries out disclosed processes and methods.

FIG. 8 shows a generalized embodiment of an example XR, MR, or AR device 800 (hereinafter "AR device 800"), in accordance with an embodiment. In an embodiment, the AR device 800 is an example embodiment of, or the same as, device 718 of FIG. 7. The AR device 800 may receive advertisements and data via input/output (I/O) path 802. The I/O path 802 may provide audio content (e.g., broadcast programming, on-demand programming, internet content, content available over a local area network (LAN) or wide area network (WAN), and/or other content) and data to control circuitry 804, which includes processing circuitry 806 and a storage 808. The control circuitry 804 may be used to send and receive commands, requests, and other suitable data using the I/O path 802. The I/O path 802 may connect the control circuitry 804 (and specifically the processing circuitry 806) to one or more communications paths. I/O functions may be provided by one or more of these communications paths but are shown as a single path in FIG. 8 to avoid overcomplicating the drawing. In some examples, the AR device 800 may also include I/O circuitry configured to process incoming and outgoing data, including data from the I/O path 802, the user input interface 810, the display 812, the speakers 814, the microphone 816, and the one or more sensors 818.

The control circuitry 804 may be based on any suitable processing circuitry such as the processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server-based embodiments, the control circuitry 804 may include communications circuitry suitable for allowing communications between two separate user devices.

Memory may be an electronic storage device provided as the storage 808 that is part of the control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 808 may be used to store various data, including data gathered by the one or more sensors 818, match quality values, and more. Cloud-based storage, described in relation to FIG. 8, may be used to supplement the storage 808 or instead of the storage 808.

The control circuitry 804 may include audio generating circuitry and tuning circuitry, such as one or more analog tuners, audio generation circuitry, filters or any other suitable tuning or audio circuits or combinations of such circuits. The control circuitry 804 may also include scaler circuitry for upconverting and down converting content into the preferred output format of the primary equipment device 800. The control circuitry 804 may also include digital-to-analog converter circuitry and analog-to-digital converter circuitry for converting between digital and analog signals.

The AR device 800 may include an interface 810. The interface 810 may be any suitable user interface, such as a remote control, mouse, trackball, keypad, keyboard, touch screen, touchpad, stylus input, joystick, or other user input interfaces. A display 812 may be provided as a stand-alone device or integrated with other elements of the AR device 800. For example, the display 812 may be a projected display (e.g., an image projected on to glasses worn by the user). In such circumstances, the interface 810 may be integrated with or combined with a microphone 816. When the interface 810 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 810 may be HDTV-capable. In some embodiments, the display 812 may be a 3D display. The speaker (or speakers) 814 may be provided as integrated with other elements of primary equipment device 800 or may be a stand-alone unit. In some embodiments, the display 812 may be outputted through speaker 814.

The AR device 800 of FIG. 8 can be implemented in system 700 of FIG. 7 as computing device 718, but any other type of user equipment suitable for allowing collection of data (e.g., viewfields from a camera and other sensor data) and display of advertisements to a user are contemplated herein. The AR device 800 or any other type of suitable user equipment may also be used to implement the various functions and processes described herein.

Figure 9:
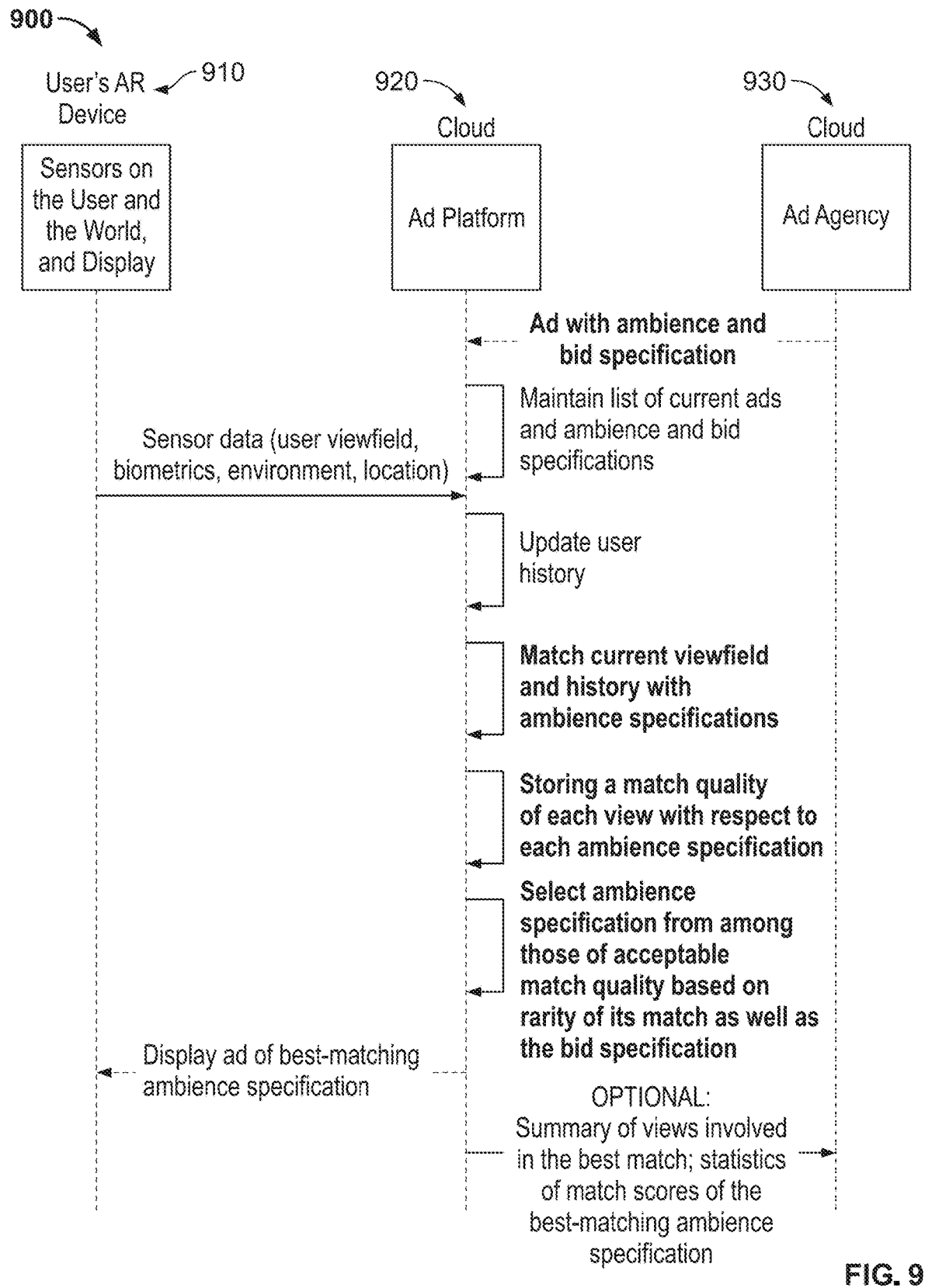
FIG. 9 is a sequence diagram illustrating an example process for providing an advertisement, in accordance with some embodiments of the disclosure.

FIG. 9 illustrates a simplified sequence diagram illustrating an example process 900 for providing an advertisement to a user, according to an embodiment. FIG. 9 includes a user device 910, an advertising platform 920, and an advertising agency device 930.

The process 900 begins with the advertising agency determining an advertisement, along with a corresponding ambience specification and bid specification. As noted above, the ambience specification details a series of view specifications, each having a list of ambience attributes (e.g., temperature, time, number of objects in view, etc.). The bid specification details the cost the advertiser is willing to pay to reach a given user, and details one or more rarity value ranges (see FIG. 6).

The advertising platform 920 stores the advertisements along with their corresponding ambience specifications and bid specifications.

At some time, the user device 910 begins collecting data via one or more sensors. The data can include images of a viewfield of the AR device, as well as various other data. The AR device may also communicate with one or more other devices to gather data. In one example, the gathered data is transmitted to the advertising platform 920.

The advertising platform 920 may then update the user history, and match the received data and history with the stored ambience specifications. This process is described in detail above with respect to FIGS. 1A, 1B, 4A, and 4B. The advertising platform 920 may determine match quality values for the various ambience specifications that are stored, to determine whether any one or more of the stored ambience specifications match the observed data from the user device 910. These match quality values may be stored, such that a history of the match quality values for a given user are available to determine a rarity of the user's circumstances, and a best fit ambience specification.

The advertising platform 920 then selects an ambience specification from among the stored ambience specifications, wherein the selected ambience specification has a high match quality based on the rarity of the match and based on the corresponding bid specification. Once a best fit ambience specification is selected, the corresponding ad is presented to the user via the user device 910.

In some examples, the process 900 also includes providing information to the advertising agency device 930 regarding the conversion rate or engagement rates of various ambience specifications, to enable the advertising agency to optimize or improve their ambience specifications.

Figure 10:
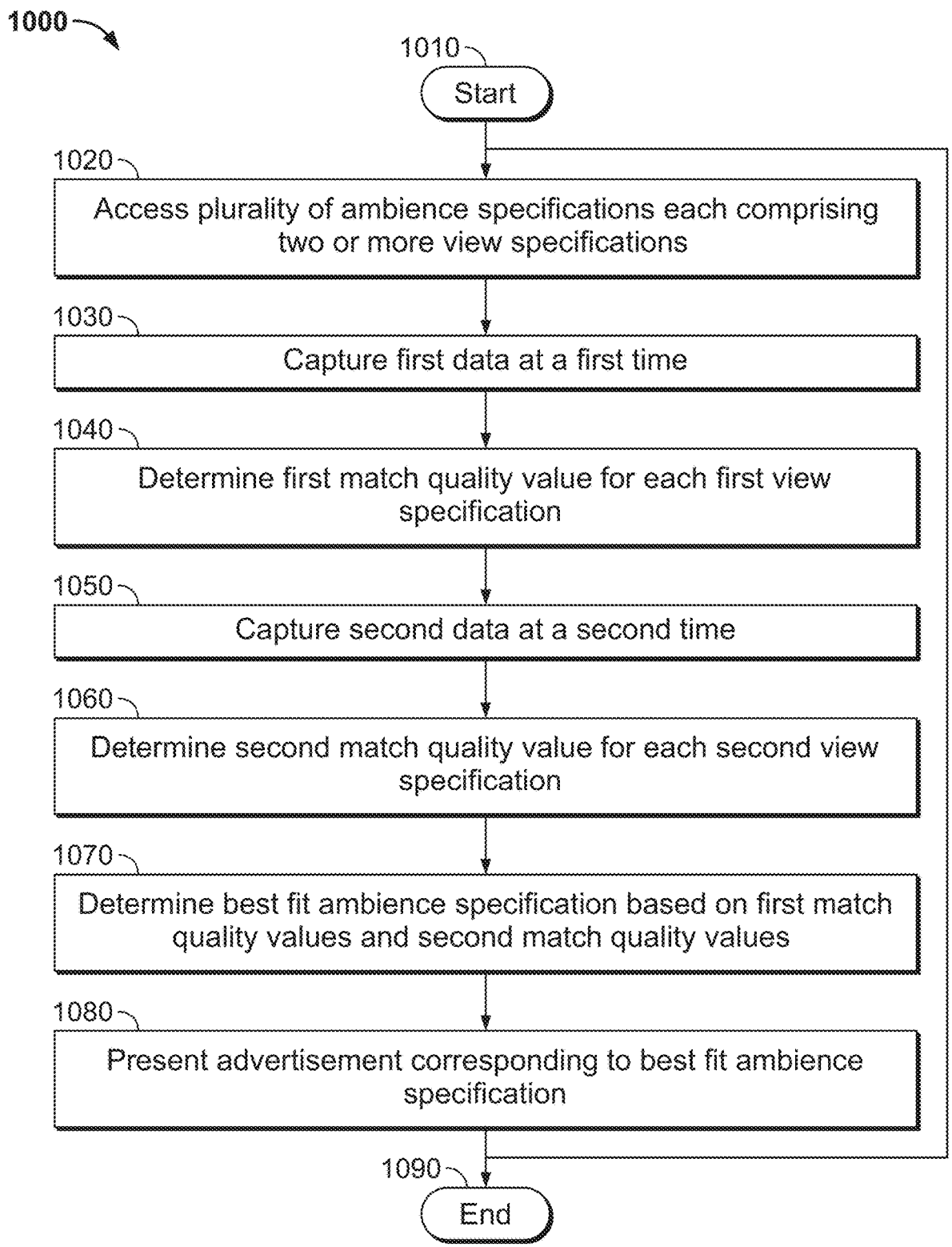
FIG. 10 is a flowchart showing an example process for providing an advertisement, in accordance with some embodiments of the disclosure.

FIG. 10 is a flowchart of illustrative steps involved in determining a best fit ambience specification and corresponding advertisement to present to a user, according to an embodiment. As shown in FIG. 10, in accordance with some embodiments, a process 1000 may be executed by processing circuitry 726, 740, 806 (FIGS. 7, 8). It should be noted that process 1000 or any step thereof could be performed on, or provided by, the system and/or devices of FIGS. 7 and 8. In addition, one or more steps of process 1000 may be incorporated into or combined with one or more other steps described herein. For example, process 1000 may be executed by control circuitry 726, 740, 806 of FIGS. 7, 8 as instructed by an advertising application implemented on a server or user device in order to determine a best fit ambience specification and corresponding advertisement to present to a user. Also, one or more steps of process 1000 may be incorporated into or combined with one or more steps of any other process or embodiment.

Process 1000 starts at step 1010.

At step 1020, process 1000 includes an advertising application accessing a plurality of ambience specifications, each comprising two or more view specifications. As noted above, each ambience specification may be generated or determined by an advertising agency such that the included view specifications (and ambience attributes) quantify an experience of a user that the advertiser wished to target. Examples include the view specifications 310A, 310B, 360A, and 360B described above with respect to the first and second ambience specifications 300 and 350.

At step 1030, the process 1000 includes capturing first data at a first time. A user's AR device may include a camera and/or one or more other sensors that capture data about the user's current circumstances, such as a viewfield, temperature, humidity, brightness, and more.

At step 1040, the advertising application then analyzes the captured first data to determine a first match quality value for each of the first view specifications that were accessed at step 1020. As noted above, this may include the advertising application determining, for each ambience attribute in each view specification, whether the captured data falls within the desired range or not, along with an ambience attribute value that indicates how well the captured data fits the ambience attribute range. Then, for each view specification, the corresponding ambience attribute values are combined to determine a match quality value for the view specification. These match quality values are then stored.

At step 1050, second data is captured at a second time. The user's AR device may include a camera and/or one or more other sensors that capture this second data about the user's current circumstances, such as a viewfield, temperature, humidity, brightness, and more.

At step 1060, the process 1000 includes the advertising application determining a second match quality value for each second view specification that was accessed at step 1020. As noted above, this may include the advertising application determining, for each ambience attribute in each view specification, whether the captured data falls within the desired range or not, along with an ambience attribute value that indicates how well the captured data fits the ambience attribute range. Then, for each view specification, the corresponding ambience attribute values are combined to determine a match quality value for the view specification. These match quality values are then stored.

At step 1070, the process 1000 includes the advertising application determining a best fit ambience specification based on the first match quality values and the second match quality values. This can include the advertising application determining a rarity value associated with the current match quality value for each ambience specification, by comparing the current match quality value to historic match quality values. Step 1070 can also include the advertising application making use of the bid specifications to determine what price an advertiser is willing to pay for a given rarity value. Based on all these factors, the advertising application may determine a best fit ambience specification.

At step 1080, the process 1000 includes the advertising application presenting an advertisement corresponding to the best fit ambience specification to the user. The process may then proceed back to step 1020 to repeat, or may end at step 1090.

Various examples above are discussed with reference to an AR device. However, it should be understood that the methods and systems disclosed herein may operate in connection with an AR device, a virtual reality (VR) device, a mixed reality device, a phone, tablet, or other computing device.

In some examples disclosed above, there is a required order of the view specifications for a given ambience specification. In some examples, the view specifications for a given ambience specification may be specified to occur in a particular order separated by some duration. For example, View A may precede View B by between 10 and 25 minutes.

In some examples, the collected data (or observations gathered by the user device) may be compared to all possible view specifications (e.g., both first and second view specification of relevant ambience specifications), and not either the first or the second vie specification for a given ambience specification. This is particularly relevant where data is collected on a rolling basis, and match quality values are constantly being determined (e.g., see FIG. 5).

In some examples, the advertising application may enable certain user settings to be selected. For example, the user may select to prevent certain sensors from being used, or preventing operation in certain environments (e.g., while at home). This may alter certain view specifications such that one or more ambience attributes are not applicable, or are not collected, analyzed, or incorporated into the final match quality values (e.g., preventing the use of voice data). In some examples the advertising application enables location based denial of the use of certain data.

In some examples, the advertising application may provide data to the advertising platform or advertising agency regarding effectiveness of the ambience specifications. In one embodiment, the advertising platform provides information on the best-matching ambience specification to the ad agency, e.g., for auditing and learning. This information can summarize the information about the match quality for each ambience specification, as well as the statistics of previous matches.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing an advertisement on an augmented reality (AR) device comprising:
   accessing a plurality of ambience specifications each having a corresponding advertisement, wherein:
      each ambience specification comprises a first view specification and a second view specification; and
      each view specification comprises a list of one or more ambience attributes;
   capturing first data at a first time using one or more sensors of the AR device, wherein:
      the one or more sensors comprise a camera and an orientation sensor; and
      the first data comprises:
         a first image of a first viewfield of the AR device, the first image captured by the camera; and
         a first view orientation of the AR device for the first viewfield, the first view orientation captured by the orientation sensor;
   identifying a visual pattern depicted in the first image and determining a first percentage of the first image comprising the visual pattern, wherein the first data further comprises the first percentage;
   determining, for each of the first view specifications of the plurality of ambience specifications, a first match quality value based on a comparison of the first data to the one or more ambience attributes of a respective first view specification, wherein the one or more ambience attributes of each of the first view specifications comprises a view orientation of the AR device;
   capturing second data at a second time, using the one or more sensors of the AR device, wherein the second data comprises:
      a second image of a second viewfield of the AR device, the second image captured by the camera; and
      a second view orientation of the AR device for the second viewfield, the second view orientation captured by the orientation sensor;
   determining a second percentage of the second image comprising the visual pattern, wherein the second data further comprises the second percentage;
   determining, for each of the second view specifications of the plurality of ambience specifications, a second match quality value based on a comparison of the second data to the one or more ambience attributes of a respective second view specification, wherein the one or more ambience attributes of each of the second view specifications comprises a change in the view orientation of the AR device;
   determining a best fit ambience specification of the plurality of ambience specifications based on the first match quality values and the second match quality values, wherein:
      the one or more ambience attributes of a first view specification of the best fit ambience specification comprises a first value of a percentage for the visual pattern; and
      the one or more ambience attributes of a second view specification of the best fit ambience specification comprises a second value of the percentage for the visual pattern; and causing the AR device to present, on a display of the AR device, the advertisement corresponding to the best fit ambience specification.

2. The method of claim 1, wherein each list of the one or more ambience attributes comprises (a) a range of allowable sensor values, or (b) a visual pattern identifiable from an image captured by the camera of the AR device.

3. The method of claim 1, wherein:
determining the first match quality value for each of the first view specifications comprises:
for each ambience attribute of the respective first view specification, determining an ambience attribute value based on the first data and a pre-defined range corresponding to the ambience attribute; and
calculating a product of the ambience attribute values for all ambience attributes of the respective first view specification; and
determining the second match quality value for each of the second view specifications comprises:
for each ambience attribute of the respective second view specification, determining an ambience attribute value based on the second data and a pre-defined range corresponding to the ambience attribute; and
calculating a product of the ambience attribute values for all ambience attributes of the respective second view specification.

4. The method of claim 1, further comprising:
capturing additional data on a rolling basis at a regular interval using the one or more sensors of the AR device;
determining, at the regular interval for each of the first and second view specifications of the plurality of ambience specifications, respective additional match quality values based on a comparison of the additional data to the ambience attributes of the respective view specification;
storing the respective additional match quality values; and
determining the best fit ambience specification of the plurality of ambience specifications based on the additional match quality values.

5. The method of claim 1, further comprising:
for each of the plurality of ambience specifications:
determining a current ambience specification value, wherein the current ambience specification value comprises a product of the first match quality value and the second match quality value; and
determining a rarity value, wherein the rarity value comprises a comparison of the current ambience specification value to historic ambience specification values; and
determining the best fit ambience specification based on the rarity values of the plurality of ambience specifications.

6. The method of claim 5, further comprising:
for each of the plurality of ambience specifications, determining a set of possible rarity value ranges, each possible rarity value range having a corresponding bid value; and
determining the best fit ambience specification based on the bid values for the plurality of ambience specifications.

7. The method of claim 1, wherein the one or more ambience attributes comprise one or more of a time of day, temperature, brightness, humidity, percentage of a viewfield of the AR device comprising a given environment, a number of people visible in the viewfield, or a number of objects visible in the viewfield.

8. The method of claim 1, wherein:
an ambience attribute of a second view specification for one or more of the plurality of ambience specifications comprises a threshold duration of time passed since the capture of the first data at the first time.

9. The method of claim 1, further comprising:
receiving, from a user of the AR device, a selection of one or more sensors that are prohibited from providing data for use in determining the first match quality value and the second match quality value.

10. The method of claim 1, wherein the second value of the percentage for the visual pattern is different than the first value of the percentage for the visual pattern.

11. A system for providing an advertisement comprising:
an augmented reality (AR) device comprising a display and one or more sensors, wherein the one or more sensors comprise a camera and an orientation sensor;
control circuitry configured to:
access a plurality of ambience specifications each having a corresponding advertisement, wherein:
each ambience specification comprises a first view specification and a second view specification; and
each view specification comprises a list of one or more ambience attributes;
input/output circuitry configured to:
capture first data at a first time using the one or more sensors, wherein the first data comprises;
a first image of a first viewfield of the AR device, the first image captured by the camera; and
a first view orientation of the AR device for the first viewfield, the first view orientation captured by the orientation sensor
wherein the control circuitry is further configured to:
identify a visual pattern depicted in the first image and determine a first percentage of the first image comprising the visual pattern, wherein the first data further comprises the first percentage;
determine, for each of the first view specifications of the plurality of ambience specifications, a first match quality value based on a comparison of the first data to the one or more ambience attributes of a respective first view specification, wherein the one or more ambience attributes of each of the first view specifications comprises a view orientation of the AR device;
wherein the input/output circuitry is further configured to capture second data at a second time, using the one or more sensors of the AR device, wherein the second data comprises:
a second image of a second viewfield of the AR device, the second image captured by the camera; and
a second view orientation of the AR device for the second viewfield, the second view orientation captured by the orientation sensor;
wherein the control circuitry is further configured to:
determine a second percentage of the second image comprising the visual pattern, wherein the second data further comprises the second percentage;
determine, for each of the second view specifications of the plurality of ambience specifications, a second match quality value based on a comparison of the second data to the one or more ambience attributes of a respective second view specification, wherein the one or more ambience attributes of each of the second view specifications comprises a change in the view orientation of the AR device; and determine a best fit ambience specification of the plurality of ambience specifications based on the first match quality values and the second match quality values, wherein:
the one or more ambience attributes of a first view specification of the best fit ambience specification comprises a first value of a percentage for the visual pattern; and
the one or more ambience attributes of a second view specification of the best fit ambience specification comprises a second value of the percentage for the visual pattern; and
wherein the input/output circuitry is further configured to cause the AR device to present, on the display, the advertisement corresponding to the best fit ambience specification.

12. The system of claim 11, wherein each list of the one or more ambience attributes comprises (a) a range of allowable sensor values, or (b) a visual pattern identifiable from an image captured by the camera of the AR device.

13. The system of claim 11, wherein:
the control circuitry is configured to determine the first match quality value for each of the first view specifications by:
for each ambience attribute of the respective first view specification, determining an ambience attribute value based on the first data and a pre-defined range corresponding to the ambience attribute; and
calculating a product of the ambience attribute values for all ambience attributes of the respective first view specification; and
the control circuitry is configured to determine the second match quality value for each of the second view specifications by:
for each ambience attribute of the respective second view specification, determining an ambience attribute value based on the second data and a pre-defined range corresponding to the ambience attribute; and
calculating a product of the ambience attribute values for all ambience attributes of the respective second view specification.

14. The system of claim 11, wherein:
the input/output circuitry is further configured to capture additional data on a rolling basis at a regular interval using the one or more sensors of the AR device; and
the control circuitry is further configured to:
determine, at the regular interval for each of the first and second view specifications of the plurality of ambience specifications, respective additional match quality values based on a comparison of the additional data to the ambience attributes of the respective view specification;
store the respective additional match quality values; and
determine the best fit ambience specification of the plurality of ambience specifications based on the additional match quality values.

15. The system of claim 11, wherein the control circuitry is further configured to:
for each of the plurality of ambience specifications:
determine a current ambience specification value, wherein the current ambience specification value comprises a product of the first match quality value and the second match quality value; and
determine a rarity value, wherein the rarity value comprises a comparison of the current ambience specification value to historic ambience specification values; and
determine the best fit ambience specification based on the rarity values of the plurality of ambience specifications.

16. The system of claim 15, wherein the control circuitry is further configured to:
for each of the plurality of ambience specifications, determine a set of possible rarity value ranges, each possible rarity value range having a corresponding bid value; and
determine the best fit ambience specification based on the bid values for the plurality of ambience specifications.

17. The system of claim 11, wherein the one or more ambience attributes comprise one or more of a time of day, temperature, brightness, humidity, percentage of a viewfield of the AR device comprising a given environment, a number of people visible in the viewfield, or a number of objects visible in the viewfield.

18. The system of claim 11, wherein:
an ambience attribute of a second view specification for one or more of the plurality of ambience specifications comprises a threshold duration of time passed since the capture of the first data at the first time.

19. The system of claim 11, wherein the input/output circuitry is further configured to receive a selection of one or more sensors that are prohibited from providing data for use in determining the first match quality value and the second match quality value.

20. The system of claim 11, wherein the second value of the percentage for the visual pattern is different than the first value of the percentage for the visual pattern.

* * * * *